United States Patent Office 3,462,310
Patented Aug. 19, 1969

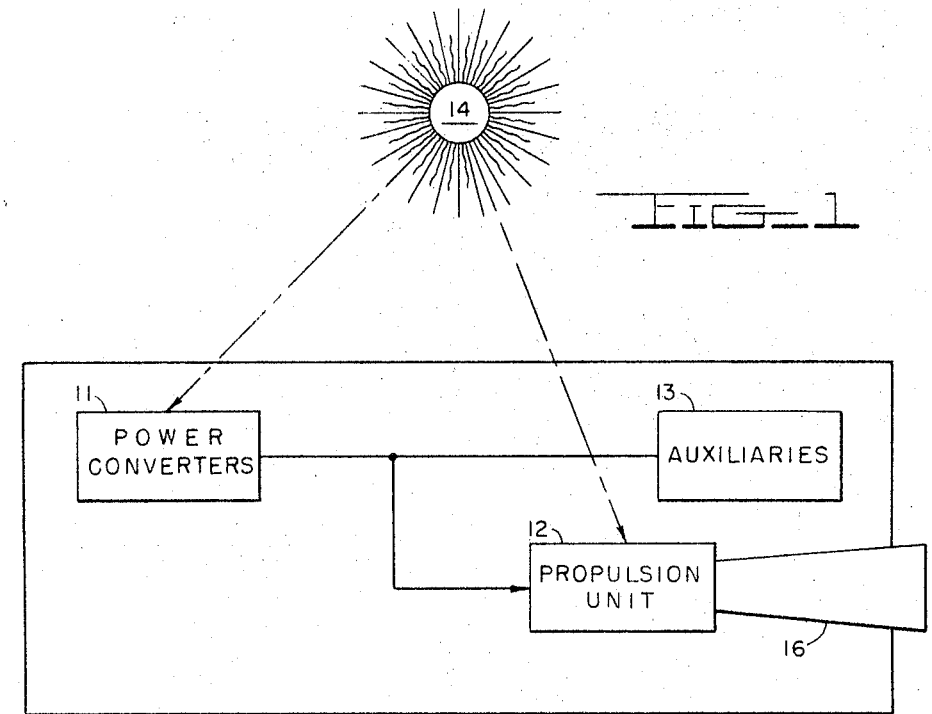
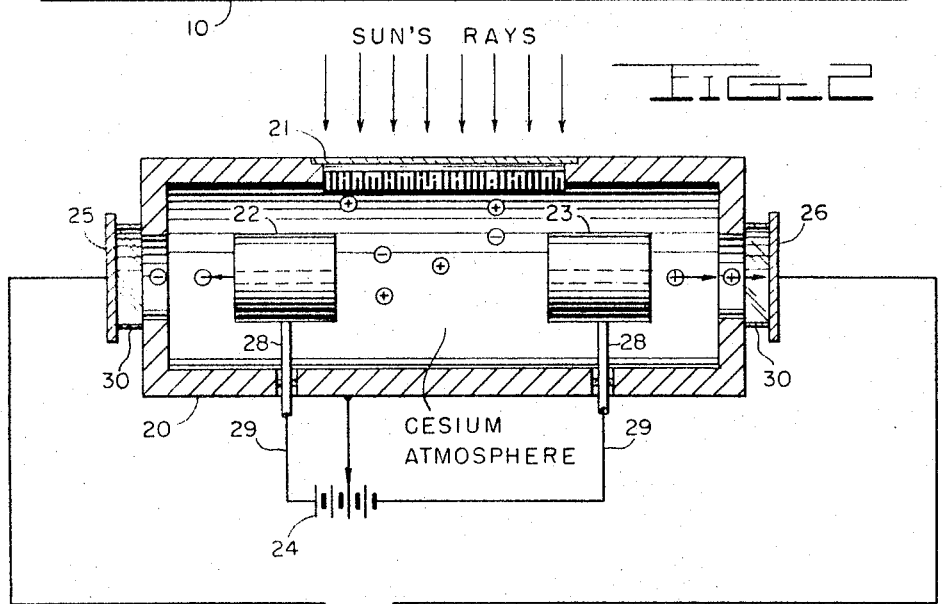

3,462,310
APPARATUS FOR THE CONVERSION OF SOLAR
ENERGY TO ELECTRICAL ENERGY
Albert M. Rubenstein, 2709 Navarre Drive,
Chevy Chase, Md. 20015
Filed Aug. 20, 1959, Ser. No. 835,150
Int. Cl. H01m 15/02
U.S. Cl. 136—89                3 Claims The invention described herein may be manufactured and used by or for the Government of the United States of America for governmental purposes without the payment of any royalties thereon or therefor.

This invention relates to the extraction of energy from radiation such as that existing in space or emitted from the sun and other sources of similar radiant energy.

The operation of vehicles in space poses a considerable problem because of the fact that during the necessarily lengthy periods of operation involved in interplanetary travel considerable power must be avaiable not only for propulsion of the vehicles but also for the operation of auxiliaries such as pumping devices of various forms, electrical devices including communication systems and object locator systems, and devices involved in the preservation of foodstuffs, habitable atmospheres and the like. To obtain such power by the normal combustion processes used on earth is impractical because of the large quantities of fuel and oxygen required for a prolonged period of space travel. Other power sources such as atomic energy sources are not subject to such limitations of weight of raw materials involved, however they do pose other problems in the form of shielding requirements, component size and weight; and other safety aspects which render them not altogether desirable for prolonged space operation of auxiliary units.

The sun and other similar celestial bodies provide considerable radiation energy in the form of ultraviolet rays, soft X-rays, and infrared radiation in interplanetary space where the shielding effects of the planetary atmosphere are not present, as well as the visible radiation which reaches the surfaces of the planets. However, prior art methods for the extraction and utilization of such energy have not been particularly desirable or practical, usually requiring the conversion of solar infrared radiation into some intermediate energy form which offers many additional problems such as steam which in turn is utilized to drive mechanical devices to produce electrical energy. A more direct method for the production of electrical energy from solar radiation is much more desirable because of the possibility of reduction in weight and volume of associated equipment without consumption of fuel, oxidant, or other raw materials to provide energy.

Accordingly it is an object of the present invention to provide apparatus capable of transforming solar radiant energy into electrical energy.

Another object of the present invention is to provide apparatus for utilizing solar radiant energy to propel a vehicle in space with benefit of high specific impulse and provide power for the operation of auxiliary equipment located on such vehicle.

Other and further objects and features of the present invention will become apparent from a careful consideration of the following description and the accompanying drawings wherein:

FIG. 1 indicates in block form an overall system for the conversion of solar radiation into electrical energy which can be typically used for further extraction of energy from solar radiation to derive propulsive forces for a space vehicle.

FIG. 2 shows details of the power converter of FIG. 1 by means of which solar radiant energy is converted into electrical energy.

With reference now to FIG. 1 of thed rawings, the overall apparatus shown therein is a somewhat schematic representation of a space vehicle 10 containing a plurality of power converters 11 and a propulsion unit 12 with outlet nozzle assembly 16, together with auxiliary units 13 which may typically be fluid moving devices, electrical communication systems or the like. The power converters 11 and the propulsion unit 12 include suitable enclosures containing radiation ionizable material such as cesium with portions thereof which are transparent to radiation from the sun 14. In the operation of this device of FIG. 1, therefore, the radiant energy from the sun 14 provides for the ionization of cesium within the power converters 11 and the propulsion unit 12, the power converters 11 providing electrical power to operate the auxiliaries 13 as well as to provide accelerating fields for the propulsion unit 12.

With reference now to FIG. 2 of the drawing the power converter appaartus shown therein contains an enclosure 20 which may contain cesium vapor at a low pressure typically of the order of .001 millimeter pressure or a more dense plasma in which the electrons or ions can move. Enclosure 20 has a portion indicated by numeral 21 which is transparent to ultraviolet and X-ray radiation from the sun. Typically this window 21 could be of quartz or other similar material and which forms a vapor tight closure. Disposed within enclosure 20 are two particle accelerator and focusing devices 22 and 23 which are maintained at potential differences relative to the envelope by means of a battery or other suitable polarizing potential source 24. Typically the envelope 20, or acceleration critical portions thereof, could be connected to some intermediate point on the battery 24 thereby placing the particle accelerating and focusing devices 22 and 23 at positive and negative potentials relative to the envelope 20. Near the ends of envelope 20 are placed collector plates 25 and 26 to collect charged particles sent in their direction by the accelerating and focusing devices 22 and 23. The impingement of such charged particles on plates 25 and 26 causes these plates to assume potential differences. The ions are converted to neutral atoms by capturing electrons from plate 26. Plates 25 and 26 are connected respectively to negative and positive terminals of an energy storage device 27 which may typically be a battery or a capacity storage device. The acceleration and focusing devices 22 and 23 are suitably supported within enclosure 20 by appropriate members having adequate structural rigidity for the purposes involved indicated in general by the numerals 28, connections to the accelerating and focusing devices being made through suitable insulated terminals indicated in general by the numerals 29, which may actually be several leads for each in those instances when several potentials are desired within the devices 22 and 23. Likewise the collector plates 25 and 26 are suitably insulated from the enclosure 20 by gas-tight seals indicated in general by the numerals 30 to preserve the atmosphere of cesium within enclosure 20.

The storage device voltage will in general be limited by that of the accelerating voltage supply 24. It is understood that by sequential connecting to a plurality of energy storage devices, various voltages and amounts of current and energy are available. As a matter of fact these can be used regeneratively to increase the schematic accelerating battery potential 24, which in turn will increase the energy that can be stored in an individual energy storage 27.

In operation of the device of FIG. 2, the cesium atmosphere contained therein is ionized by solar radiation entering window 21 resulting in the production of electrons and positive cesium ions within the central area of enclosure 20 between the two sets of accelerating and focusing devices 22 and 23. The accelerating and focusing devices 22 and 23 then operate to accelerate these charged particles in the direction of the collector plates 25 and 26, the electrons passing to the collector 25, the positive ions being directed toward the collector 26. It is thus seen that the accelerating and focusing devices 22 and 23 are preferably designed and provided with sufficient control components to insure that the charged particles are directed thereby rather than collected thereby, the purpose being to reduce the current flow therethrough and hence the drain upon the battery 24. With adequate design of the accelerating and focusing devices 22 and 23 it is possible to achieve a situation wherein substantially no current is drawn from the battery 24 by the accelerating and focusing devices 22 and 23, a situation somewhat akin to that existing in a cathode ray tube. Thus these devices are employed to control the direction of travel of charged particles rather than directly intercept any substantial amounts thereof. With the charged particles being accelerated in the directions of the plates 25 and 26 they are collected by these plates resulting in the flow of energy to the energy storage device 27. It is to be observed that such collection of charged particles results in the accumulation of cesium near plate 26, such cesium being neutral by virtue of the fact that electrons have been supplied thereto from the plate 26. Such neutral cesium atoms must return to the central region of exposure to the sun's rays. For this purpose attention must be given to the design of the focusing and accelerating device 23 and the appropriate pressure and accelerating voltages to permit a substantial amount of such neutral cesium atoms to flow (by diffusion) to this central region where they may again be ionized in continuation of the process.

It is thus seen that the device of FIG. 2 is capable of producing charging of energy storage device 27 by exposure to radiation from the sun, there being no requirement for internal consumption or permanent alteration of the working material cesium.

In instances where higher potentials are desired than those which can be produced by a single stage device such as that of FIG. 2, similar devices can be connected in series, their voltages being made additive to produce higher output potentials. In such instances it may be convenient to use potentials developed by certain members of the plurality of devices so connected in series to provide potentials for other devices in the series connection or to increase the potential of 24, as mentioned previously.

Obviously many modifications and variations of the present invention are possible in the light of the above teachings. It is therefore to be understood that within the scope of the appended claims the invention may be practiced otherwise than as specifically described.

What is claimed is:
1. Apparatus for producing electrical energy from ionizing radiation comprising, an enclosed chamber, said chamber containing cesium which will provide positively charged cesium ions and negative charged electrons in response to the ionizing radiation, said chamber having a portion thereof which will admit the ionizing radiation and retain the cesium, means for separating the negative charged particles from the positive charged particles, and additional means for separately collecting the positive and negative charged particles.

2. Apparatus for producing electrical energy from ionizing radiation comprising, an enclosed chamber, said chamber containing cesium to provide positively charged cesium ions and negative charged electrons in response to the ionizing radiation, said chamber having a portion thereof which will admit the ionizing radiation, beam forming means for producing separate beams of electrons and positively charged cesium ions, and means for separately collecting the positive and negatively charged particles whereby positive and negative potentials are produced and the cesium ions returned to neutral cesium.

3. Apparatus for producing electrical energy from ionizing radiation comprising, an enclosed chamber, said chamber containing cesium to provide positively charged cesium ions and negative charged electrons in response to the ionizing radiation, said chamber having a portion thereof which will admit the ionizing radiation and retain the cesium, beam forming means for producing separate beams of electrons and positively charged cesium ions, first and second electrode means for separately collecting the positively and negatively charged particles whereby the electrode means are placed at different potentials, and an external utilization circuit connected to said electrode means.

References Cited

UNITED STATES PATENTS 2,817,776  12/1957  Cohen _____ 310—3

OTHER REFERENCES

Washington Post and Times Herald, pp. A-1, A-6 (column 4), Apr. 8, 1959.

BENJAMIN R. PADGETT, Primary Examiner

MICHAEL J. McGREAL, Assistant Examiner

U.S. Cl. X.R.

310—4